United States Patent
Gottmann et al.

(10) Patent No.: US 8,968,958 B2
(45) Date of Patent: Mar. 3, 2015

(54) VOLTAGE LEAD JUMPER CONNECTED FUEL CELL COLUMNS

(75) Inventors: Matthias Gottmann, Sunnyvale, CA (US); Martin Perry, Sunnyvale, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 812 days.

(21) Appl. No.: 12/458,171

(22) Filed: Jul. 2, 2009

(65) Prior Publication Data

US 2010/0009221 A1  Jan. 14, 2010

Related U.S. Application Data

(60) Provisional application No. 61/129,621, filed on Jul. 8, 2008.

(51) Int. Cl.
| | | |
|---|---|---|
| H01M 8/24 | (2006.01) | |
| H01M 8/12 | (2006.01) | |
| H01M 2/20 | (2006.01) | |
| H01M 4/64 | (2006.01) | |
| H01M 8/04 | (2006.01) | |
| H01M 8/06 | (2006.01) | |

(52) U.S. Cl.
CPC ............ *H01M 8/249* (2013.01); *H01M 8/2475* (2013.01); *H01M 2/202* (2013.01); *H01M 8/04022* (2013.01); *H01M 8/0618* (2013.01); *H01M 8/0631* (2013.01); *Y02E 60/50* (2013.01)
USPC ........... 429/471; 429/455; 429/465; 429/468; 429/518; 429/430

(58) Field of Classification Search
CPC ......................................... H01M 8/249–8/2495
USPC .......................................................... 429/471
See application file for complete search history.

(56) References Cited

U.S. PATENT DOCUMENTS

| | | |
|---|---|---|
| 3,453,087 A | 7/1969 | Herp, Jr. et al. |
| 3,453,146 A | 7/1969 | Bawa et al. |
| 3,488,266 A | 1/1970 | French |
| 3,527,565 A | 9/1970 | Banchik et al. |
| 3,531,263 A | 9/1970 | Sederquist |
| 3,607,419 A | 9/1971 | Keating, Jr. |
| 3,645,701 A | 2/1972 | Banchik et al. |
| 3,718,506 A | 2/1973 | Fischer et al. |
| 3,746,658 A | 7/1973 | Porta et al. |

(Continued)

FOREIGN PATENT DOCUMENTS

| | | |
|---|---|---|
| EP | 0 398 111 A1 | 11/1990 |
| EP | 0 977 294 B1 | 2/2000 |

(Continued)

OTHER PUBLICATIONS

U.S. Appl. No. 11/656,006, filed Jan. 22, 2007, Sridhar et al.

(Continued)

*Primary Examiner* — Barbara Gilliam
*Assistant Examiner* — Robert S Carrico
(74) *Attorney, Agent, or Firm* — The Marbury Law Group PLLC

(57) ABSTRACT

A fuel cell system includes a plurality of fuel cell stacks, and one or more devices which in operation of the system provide an azimuthal direction to one or more anode or cathode feed or exhaust fluid flows in the system.

11 Claims, 17 Drawing Sheets

(56) References Cited

U.S. PATENT DOCUMENTS

| | | | |
|---|---|---|---|
| 3,972,731 A | 8/1976 | Bloomfield et al. | |
| 3,973,993 A | 8/1976 | Bloomfield et al. | |
| 3,976,506 A | 8/1976 | Landau | |
| 3,982,962 A | 9/1976 | Bloomfield | |
| 3,990,912 A | 11/1976 | Katz | |
| 3,995,665 A * | 12/1976 | Monaghan | 138/147 |
| 4,001,041 A | 1/1977 | Menard | |
| 4,004,947 A | 1/1977 | Bloomfield | |
| 4,041,210 A | 8/1977 | Van dine | |
| 4,098,722 A | 7/1978 | Cairns et al. | |
| 4,182,795 A | 1/1980 | Baker et al. | |
| 4,190,559 A | 2/1980 | Retallick | |
| 4,315,893 A | 2/1982 | Mccallister | |
| 4,342,816 A | 8/1982 | Kothmann et al. | |
| 4,365,007 A | 12/1982 | Maru et al. | |
| 4,374,184 A | 2/1983 | Somers et al. | |
| 4,402,871 A | 9/1983 | Retallick | |
| 4,430,304 A | 2/1984 | Spurrier et al. | |
| 4,473,517 A | 9/1984 | Goedtke et al. | |
| 4,473,622 A | 9/1984 | Chludzinski et al. | |
| 4,522,894 A | 6/1985 | Hwang et al. | |
| 4,532,192 A | 7/1985 | Baker et al. | |
| 4,539,267 A | 9/1985 | Sederquist | |
| 4,548,875 A | 10/1985 | Lance et al. | |
| 4,554,223 A | 11/1985 | Yokoyama et al. | |
| 4,567,117 A | 1/1986 | Patel et al. | |
| 4,647,516 A | 3/1987 | Matsumura et al. | |
| 4,654,207 A | 3/1987 | Preston | |
| 4,657,829 A | 4/1987 | Mcelroy et al. | |
| 4,670,359 A | 6/1987 | Beshty et al. | |
| 4,678,723 A | 7/1987 | Wertheim | |
| 4,696,871 A | 9/1987 | Pinto | |
| 4,702,973 A | 10/1987 | Marianowski | |
| 4,716,023 A | 12/1987 | Christner et al. | |
| 4,722,873 A | 2/1988 | Matsumura | |
| 4,728,584 A | 3/1988 | Isenberg | |
| 4,737,161 A | 4/1988 | Szydlowski et al. | |
| 4,792,502 A | 12/1988 | Trocciola et al. | |
| 4,808,491 A | 2/1989 | Reichner | |
| 4,810,472 A | 3/1989 | Andrew et al. | |
| 4,812,373 A | 3/1989 | Grimble et al. | |
| 4,820,314 A | 4/1989 | Cohen et al. | |
| 4,824,740 A | 4/1989 | Abrams et al. | |
| 4,828,940 A | 5/1989 | Cohen et al. | |
| 4,847,051 A | 7/1989 | Parenti, Jr. | |
| 4,865,926 A | 9/1989 | Levy et al. | |
| 4,898,792 A | 2/1990 | Singh et al. | |
| 4,904,548 A | 2/1990 | Tajima | |
| 4,917,971 A | 4/1990 | Farooque | |
| 4,933,242 A | 6/1990 | Koga et al. | |
| 4,983,471 A | 1/1991 | Reichner et al. | |
| 4,994,331 A | 2/1991 | Cohen | |
| 5,009,967 A | 4/1991 | Scheffler | |
| 5,034,287 A | 7/1991 | Kunz | |
| 5,039,579 A | 8/1991 | Kinoshita | |
| 5,047,299 A | 9/1991 | Shockling | |
| 5,077,148 A | 12/1991 | Schora et al. | |
| 5,079,105 A | 1/1992 | Bossel | |
| 5,082,751 A | 1/1992 | Reichner | |
| 5,082,752 A | 1/1992 | Koga et al. | |
| 5,084,362 A | 1/1992 | Farooque | |
| 5,084,363 A | 1/1992 | Reiser | |
| 5,091,075 A | 2/1992 | O'Neill et al. | |
| 5,100,743 A | 3/1992 | Narita et al. | |
| 5,143,800 A | 9/1992 | George et al. | |
| 5,169,730 A | 12/1992 | Reichner et al. | |
| 5,170,124 A | 12/1992 | Blair et al. | |
| 5,175,062 A | 12/1992 | Farooque et al. | |
| 5,187,024 A | 2/1993 | Matsumura | |
| 5,212,022 A | 5/1993 | Takahashi et al. | |
| 5,227,256 A | 7/1993 | Marianowski et al. | |
| 5,232,792 A | 8/1993 | Reznikov | |
| 5,246,791 A | 9/1993 | Fisher et al. | |
| 5,270,127 A | 12/1993 | Koga et al. | |
| 5,302,470 A | 4/1994 | Okada et al. | |
| 5,324,452 A | 6/1994 | Allam et al. | |
| 5,328,779 A | 7/1994 | Tannenberger et al. | |
| 5,340,664 A | 8/1994 | Hartvigsen | |
| 5,344,721 A | 9/1994 | Sonai et al. | |
| 5,346,779 A | 9/1994 | Nakazawa | |
| 5,348,814 A | 9/1994 | Niikura et al. | |
| 5,360,679 A | 11/1994 | Buswell et al. | |
| 5,366,819 A | 11/1994 | Hartvigsen et al. | |
| 5,441,821 A | 8/1995 | Merritt et al. | |
| 5,453,146 A | 9/1995 | Kemper | |
| 5,470,360 A | 11/1995 | Sederquist | |
| 5,498,487 A | 3/1996 | Ruka et al. | |
| 5,501,914 A | 3/1996 | Satake et al. | |
| 5,505,824 A | 4/1996 | Mcelroy | |
| 5,516,344 A | 5/1996 | Corrigan | |
| 5,527,631 A | 6/1996 | Singh et al. | |
| 5,573,867 A | 11/1996 | Zafred et al. | |
| 5,601,937 A | 2/1997 | Isenberg | |
| 5,641,585 A | 6/1997 | Lessing et al. | |
| 5,686,196 A | 11/1997 | Singh et al. | |
| 5,693,201 A | 12/1997 | Hsu et al. | |
| 5,730,213 A | 3/1998 | Kiser et al. | |
| 5,733,675 A | 3/1998 | Dederer et al. | |
| 5,741,605 A * | 4/1998 | Gillett et al. | 429/415 |
| 5,763,114 A | 6/1998 | Khandkar et al. | |
| 5,856,035 A * | 1/1999 | Khandkar et al. | 429/443 |
| 5,914,200 A | 6/1999 | Schabert et al. | |
| 5,955,039 A | 9/1999 | Dowdy | |
| 6,013,385 A | 1/2000 | Dubose | |
| 6,051,125 A | 4/2000 | Pham et al. | |
| 6,106,967 A | 8/2000 | Virkar et al. | |
| 6,280,865 B1 | 8/2001 | Eisman et al. | |
| 6,329,090 B1 | 12/2001 | Mcelroy et al. | |
| 6,348,278 B1 | 2/2002 | Lapierre et al. | |
| 6,376,111 B1 | 4/2002 | Mathias et al. | |
| 6,383,670 B1 | 5/2002 | Edlund et al. | |
| 6,403,245 B1 | 6/2002 | Hunt | |
| 6,436,562 B1 | 8/2002 | Dubose | |
| 6,451,466 B1 | 9/2002 | Grasso et al. | |
| 6,531,243 B2 | 3/2003 | Thom | |
| 6,582,842 B1 | 6/2003 | King | |
| 6,623,880 B1 | 9/2003 | Geisbrecht et al. | |
| 6,656,625 B1 | 12/2003 | Thompson et al. | |
| 6,749,958 B2 | 6/2004 | Pastula et al. | |
| 6,797,425 B2 | 9/2004 | Blanchet | |
| 6,821,663 B2 | 11/2004 | Mcelroy | |
| 6,924,053 B2 | 8/2005 | Mcelroy | |
| 7,067,208 B2 | 6/2006 | Gottmann et al. | |
| 2001/0049035 A1 | 12/2001 | Haltiner, Jr. et al. | |
| 2002/0006535 A1 | 1/2002 | Woods et al. | |
| 2002/0028362 A1 | 3/2002 | Prediger et al. | |
| 2002/0058175 A1 | 5/2002 | Ruhl | |
| 2002/0106544 A1 | 8/2002 | Noetzel et al. | |
| 2002/0114985 A1 * | 8/2002 | Shkolnik et al. | 429/20 |
| 2002/0142208 A1 | 10/2002 | Keefer et al. | |
| 2002/0192516 A1 | 12/2002 | Tajima | |
| 2003/0031904 A1 | 2/2003 | Haltiner | |
| 2003/0049502 A1 | 3/2003 | Dickman et al. | |
| 2003/0157386 A1 | 8/2003 | Gottmann | |
| 2003/0162067 A1 | 8/2003 | Mcelroy | |
| 2003/0196893 A1 | 10/2003 | Mcelroy | |
| 2003/0205641 A1 | 11/2003 | Mcelroy | |
| 2003/0235725 A1 | 12/2003 | Haltiner et al. | |
| 2003/0235733 A1 | 12/2003 | Haltiner, Jr. | |
| 2004/0089438 A1 | 5/2004 | Valensa et al. | |
| 2004/0131912 A1 | 7/2004 | Keefer et al. | |
| 2004/0191597 A1 | 9/2004 | Mcelroy | |
| 2004/0191598 A1 | 9/2004 | Gottmann | |
| 2004/0202914 A1 | 10/2004 | Sridhar et al. | |
| 2004/0217732 A1 | 11/2004 | Zhu et al. | |
| 2004/0224193 A1 | 11/2004 | Mitlitsky et al. | |
| 2004/0253499 A1 * | 12/2004 | Sato et al. | 429/32 |
| 2005/0026011 A1 | 2/2005 | Suzuki et al. | |
| 2005/0048334 A1 | 3/2005 | Sridhar et al. | |
| 2005/0048336 A1 | 3/2005 | Takebe et al. | |
| 2005/0048338 A1 | 3/2005 | Kobayashi et al. | |
| 2005/0056412 A1 | 3/2005 | Reinke et al. | |
| 2005/0064257 A1 * | 3/2005 | Isoda et al. | 429/20 |
| 2005/0164051 A1 | 7/2005 | Venkataraman et al. | |

(56) References Cited

U.S. PATENT DOCUMENTS

| | | | |
|---|---|---|---|
| 2005/0170235 A1 | 8/2005 | Hu et al. | |
| 2005/0249988 A1 | 11/2005 | Pearson | |
| 2005/0269234 A1* | 12/2005 | Gore et al. | 206/524 |
| 2006/0134470 A1* | 6/2006 | Kaye et al. | 429/12 |
| 2006/0147771 A1 | 7/2006 | Russell et al. | |
| 2006/0204827 A1 | 9/2006 | Hickey et al. | |
| 2006/0248799 A1 | 11/2006 | Bandhauer et al. | |
| 2006/0251934 A1 | 11/2006 | Valensa | |
| 2006/0251939 A1 | 11/2006 | Bandhauer et al. | |
| 2006/0251940 A1 | 11/2006 | Bandhauer et al. | |
| 2007/0017369 A1 | 1/2007 | Levan et al. | |
| 2007/0087237 A1* | 4/2007 | An et al. | 429/23 |
| 2007/0196704 A1 | 8/2007 | Valensa et al. | |
| 2007/0243435 A1 | 10/2007 | Dutta | |
| 2007/0259230 A1* | 11/2007 | Berntsen et al. | 429/23 |
| 2008/0038600 A1 | 2/2008 | Valensa et al. | |
| 2008/0038622 A1 | 2/2008 | Valensa et al. | |

FOREIGN PATENT DOCUMENTS

| | | |
|---|---|---|
| EP | 1 501 146 A2 | 1/2005 |
| JP | 60-235365 | 11/1985 |
| WO | WO 94/18712 A1 | 8/1994 |
| WO | WO 2004/013258 | 2/2004 |
| WO | WO 2004/092756 | 10/2004 |
| WO | WO 2004/093214 | 10/2004 |

OTHER PUBLICATIONS

"Low Cost, High Efficiency Reversible Fuel Cell (and Electrolyzer) Systems," (Technology Management Inc.), Proceedings of the 2001 DOE Hydrogen Program Review NREL/CP-570-30535, pp. 1-7, (2001).

"Small, Ultra Efficient Fuel Cell Systems," (Technology Management Inc.), Advanced Technology Program ATP 2001 Competition, pp. 1-2, (Jun. 2002).

Anonymous, Presentation of the LabView-based software used in the Fuel Cell Technologies Testing System. Internet Article, Jul. 15, 2004, http://web.archive.org/web/20040715025135/fuelcelltechnologies.com/Support/Downloads/Tutorial.pdf.

Austin, "Cell and Stack Construction: Low-Temperature Cells," *Fuel Cells: A Review of Government-Sponsored Research*, 1950-1964, NASA SP-120, pp. 101-102, (1967).

Hamburger, R. O., et al., "LabView DSC Automates Fuel Cell Catalyst Research", Nov. 4, 2004, http://web.archive.org/web/20041104200039/http://bloomy.com/newsletters/fuelcellresearch.pdf.

Milliken et al., "Low Cost, High Efficiency Reversible Fuel Cell Systems," Proceedings of the 2002 U.S. DOE Hydrogen Program Review, NREL/CP-610-32405, pp. 1-14, (2002).

Mitlitsky et al., "Unitized Regenerative Fuel Cells for Solar Rechargeable Aircraft and Zero Emission Vehicles," 1994 Fuel Cell Seminar, UCRL-JC-117130, pp. 1-7, (Sep. 6, 1994).

Mitlitsky, et al., "Regenerative Fuel Cells for High Altitude Long Endurance Solar Powered Aircraft," Intersociety Energy Conversion Engineering Conference (IECEC), UCRL-JC-113485, pp. 1-8, (Jul. 28, 1993).

Ruhl, "Low Cost Reversible Fuel Cell System," Proceedings of the 2000 U.S. DOE Hydrogen Program Review, NREL/CP-570-28890, pp. 1-9, (Jun. 15, 2000).

* cited by examiner

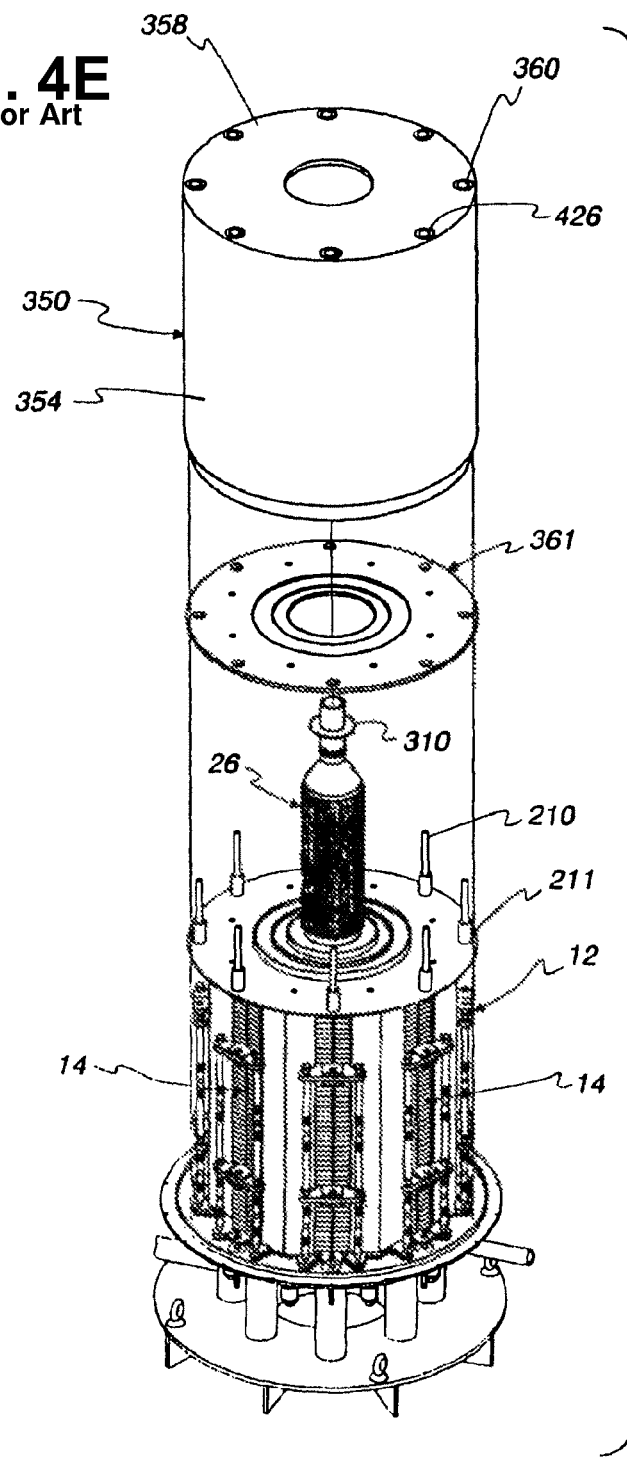

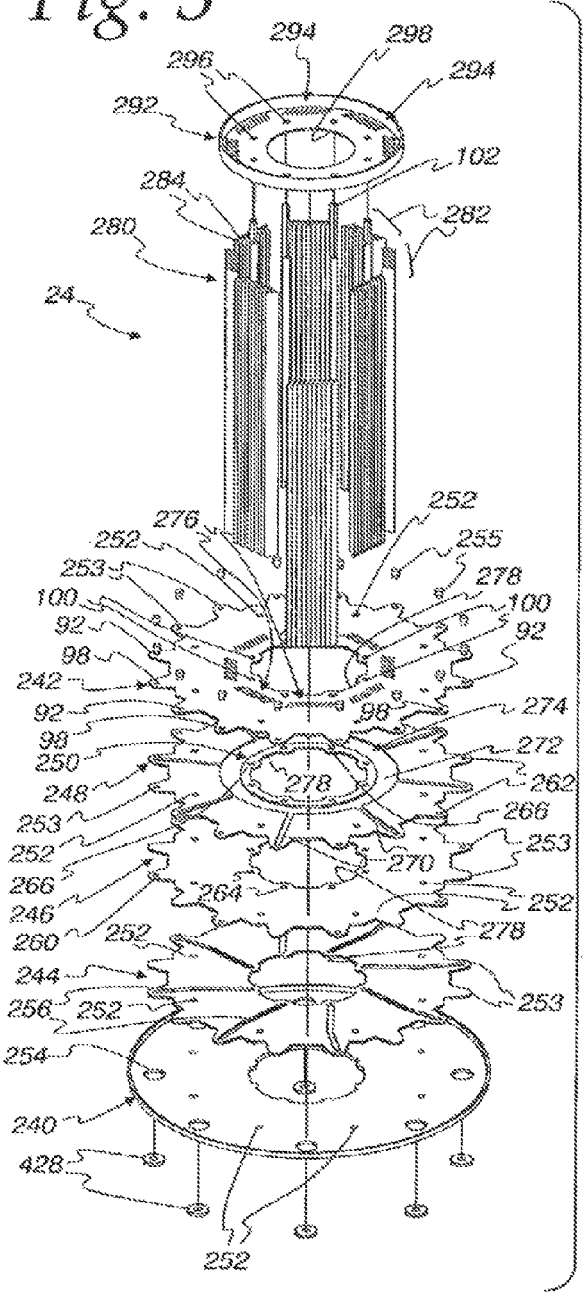

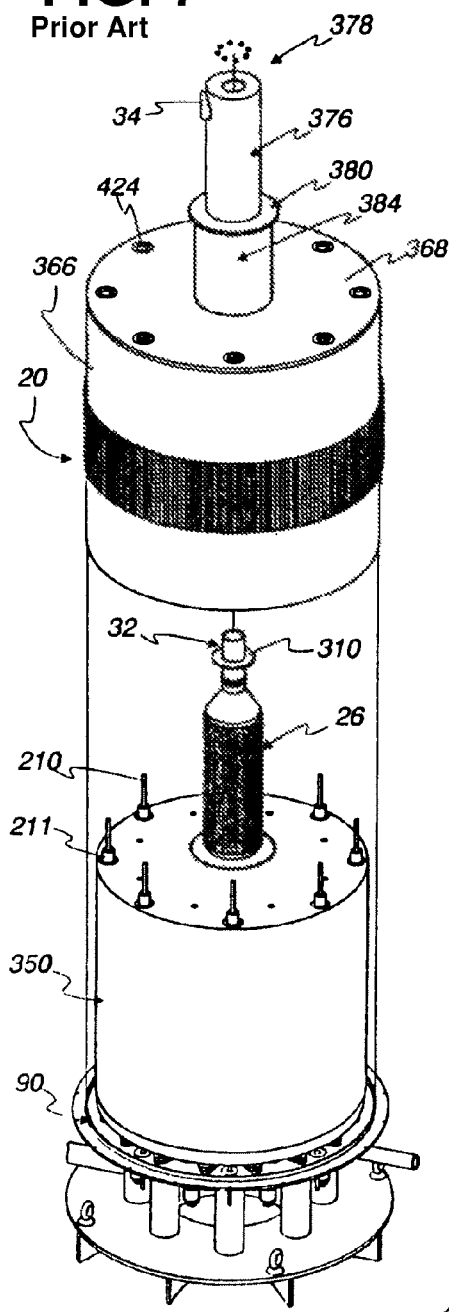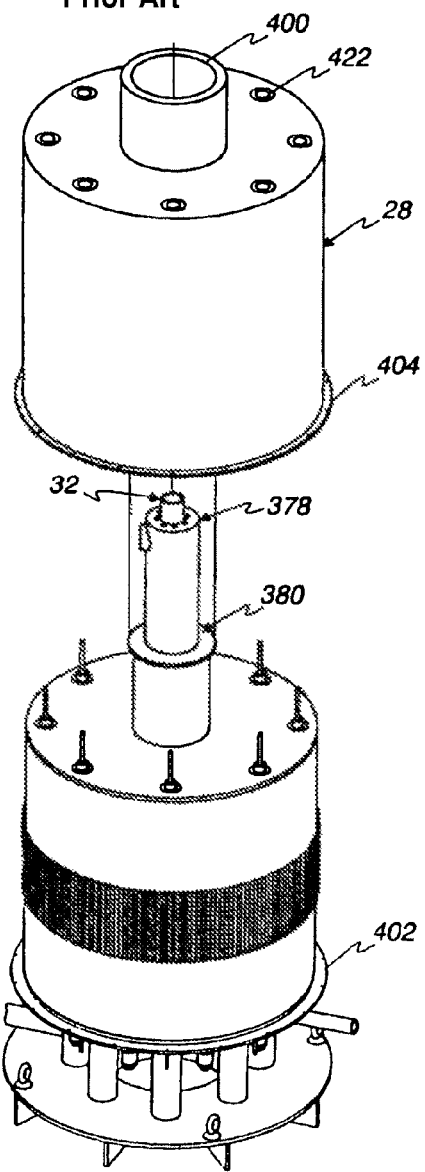

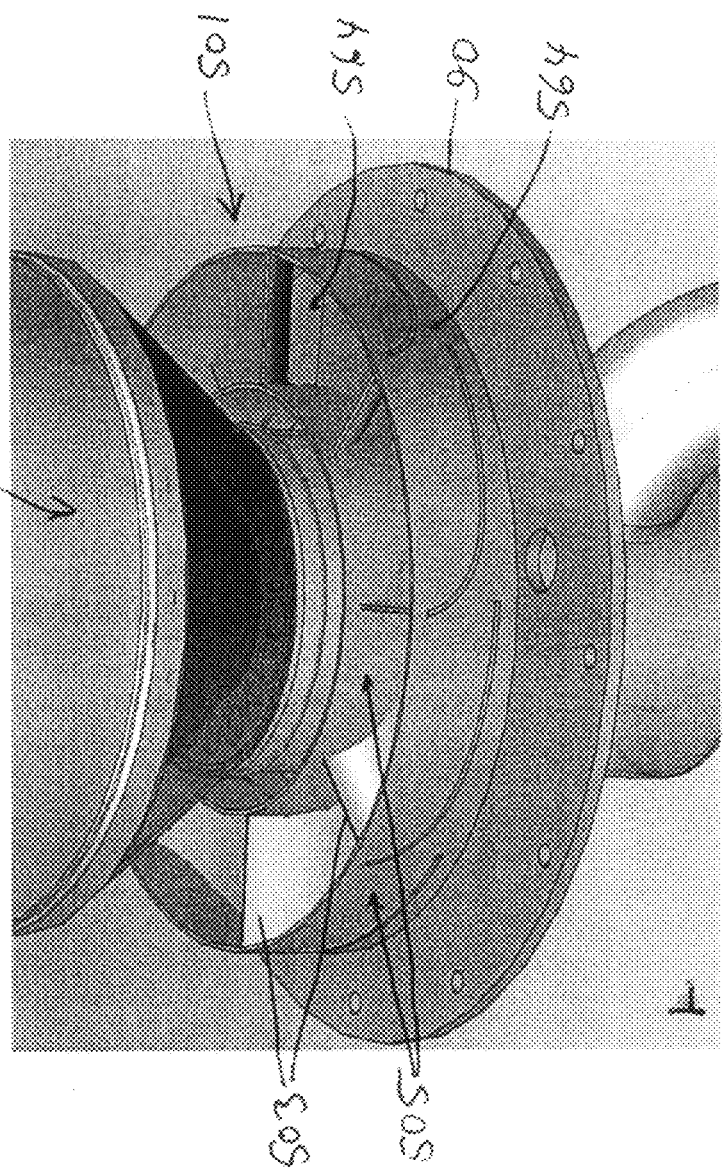

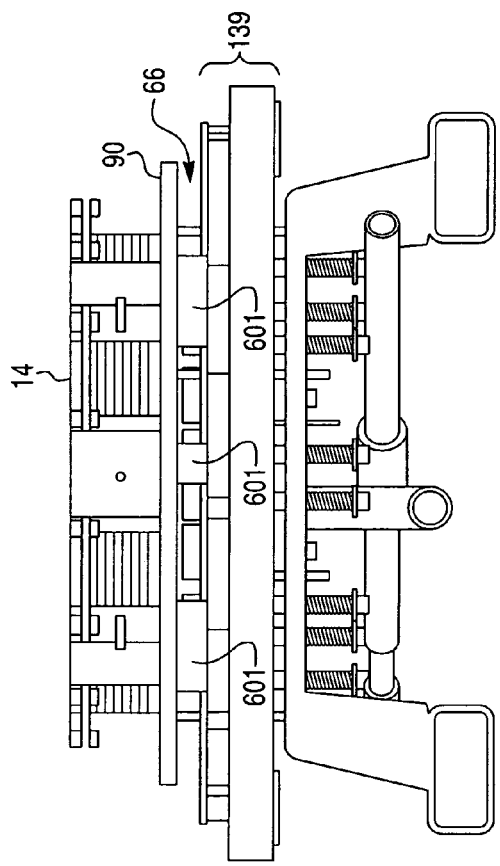
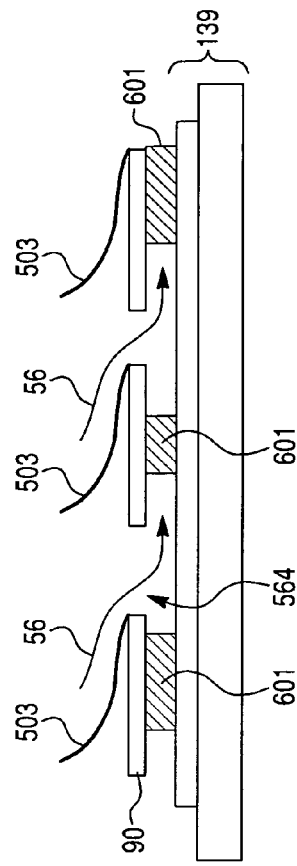
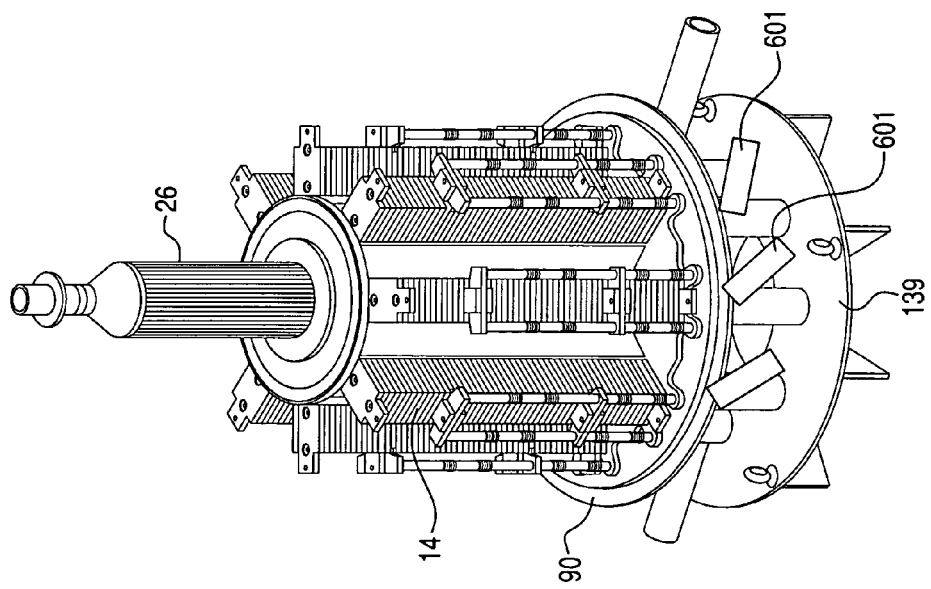

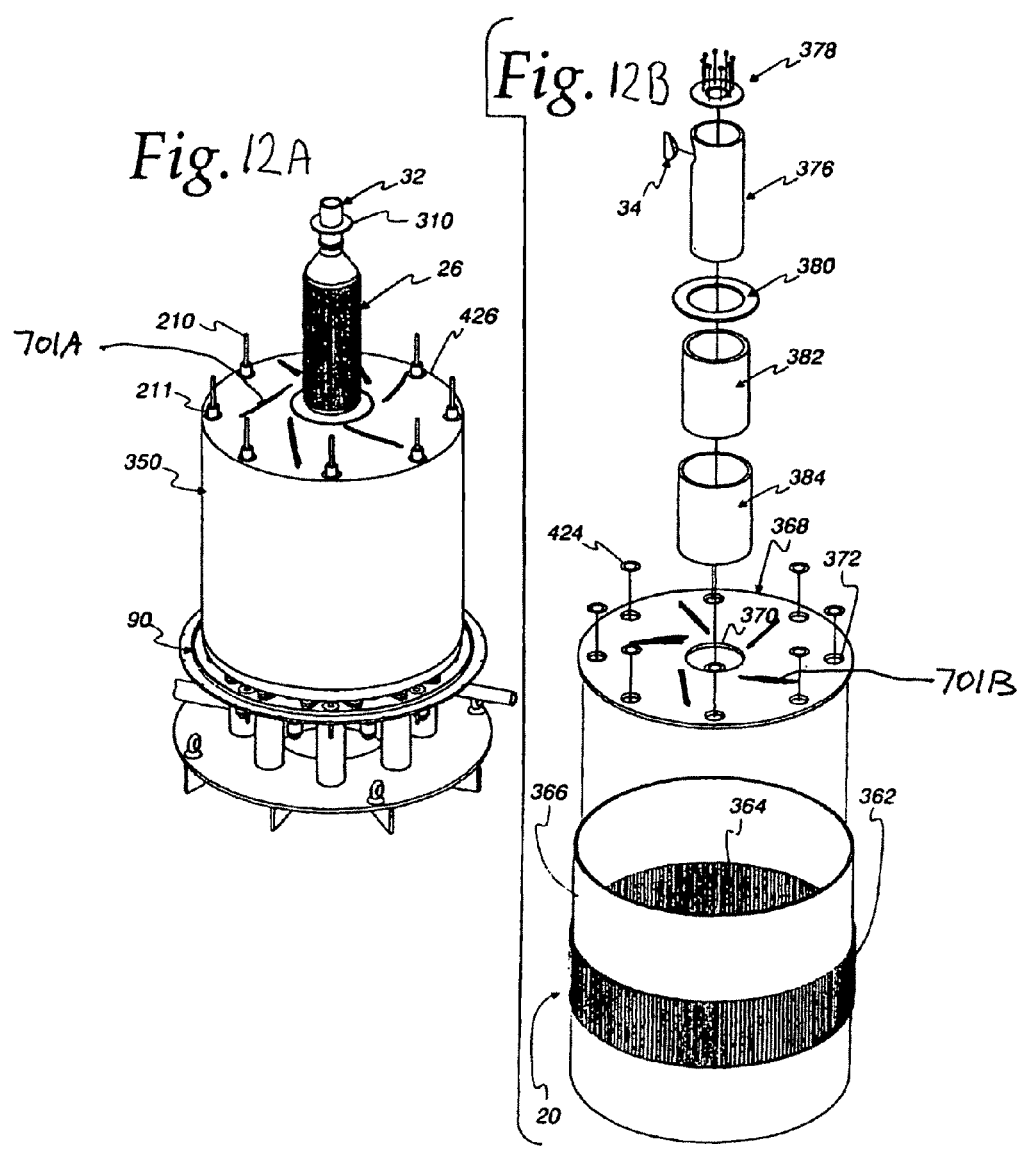

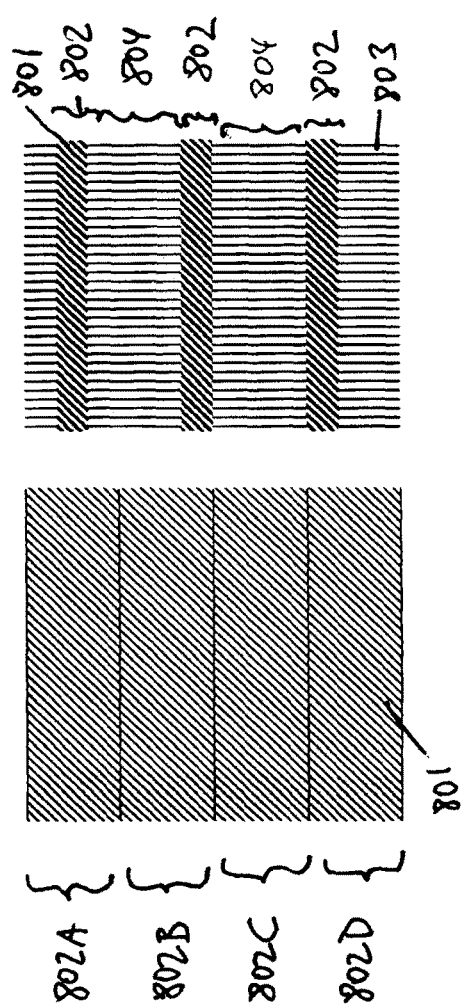

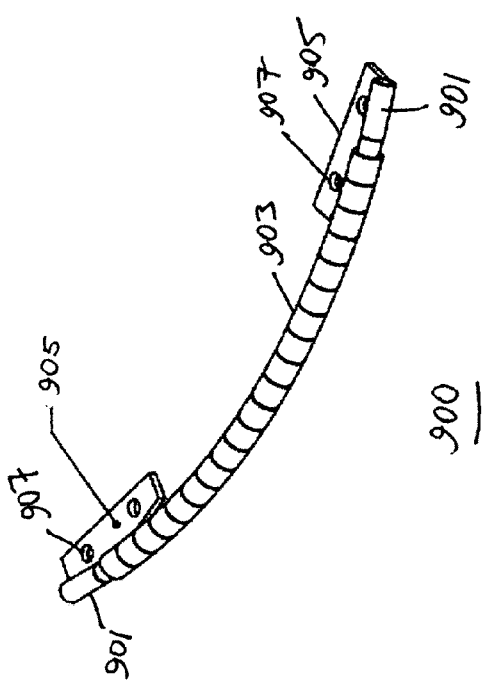

VOLTAGE LEAD JUMPER CONNECTED FUEL CELL COLUMNS

CROSS REFERENCE TO RELATED PATENT APPLICATIONS

The present application claims benefit of U.S. provisional patent application Ser. No. 61/129,621, filed Jul. 8, 2008, which is incorporated herein by reference in its entirety.

BACKGROUND

The present invention relates generally to fuel cell systems and more specifically to fuel cell systems containing recuperators or heat exchangers with spiral flow and methods of operating same.

FIGS. 1-9 illustrate a prior art fuel cell system described in U.S. Published Application 2007/0196704 A1 published on Aug. 23, 2007 (filed as Ser. No. 11/656,563 on Jan. 23, 2007) titled Integrated Solid Oxide Fuel Cell And Fuel Processor and incorporated herein by reference in its entirety. Specifically, with reference to FIGS. 1, 2A, 2B and 3A, an integrated fuel cell unit 10 is shown in form of an integrated solid oxide fuel cell ("SOFC")/fuel processor 10 having a generally cylindrical construction. The unit 10 includes an annular array 12 of eight (8) fuel cell stacks 14 surrounding a central axis 16, with each of the fuel cell stacks 14 having a stacking direction extended parallel to the central axis 16, with each of the stacks having a face 17 that faces radially outward and a face 18 that faces radially inward. As best seen in FIG. 3A the fuel cell stacks 14 are spaced angularly from each other and arranged to form a ring-shaped structure about the axis 16. Because there are eight of the fuel cell stacks 14, the annular array 12 could also be characterized as forming an octagon-shaped structure about the axis 16. While eight of the fuel cell stacks 14 have been shown, it should be understood that the invention contemplates an annular array 12 that may include more than or less than eight fuel cell stacks.

With reference to FIG. 1, the unit 10 further includes an annular cathode recuperator 20 located radially outboard from the array 12 of fuel stacks 14, an annular anode recuperator 22 located radially inboard from the annular array 12, a reformer 24 also located radially inboard of the annular array 12, and an annular anode exhaust cooler/cathode pre-heater 26, all integrated within a single housing structure 28. The housing structure 28 includes an anode feed port 30, an anode exhaust port 32, a cathode feed port 34, a cathode exhaust port 36, and an anode combustion gas inlet port 37. An anode exhaust combustor (typically in the form an anode tail gas oxidizer (ATO) combustor), shown schematically at 38, is a component separate from the integrated unit 10 and receives an anode exhaust flow 39 from the port 32 to produce an anode combustion gas flow 40 that is delivered to the anode combustion gas inlet 37. During startup, the combustor 38 also receives a fuel flow (typically natural gas), shown schematically by arrow 41. Additionally, some of the anode exhaust flow may be recycled to the anode feed port 30, as shown by arrows 42. In this regard, a suitable valve 43 may be provided to selectively control the routing of the anode exhaust flow to either the combustor 38 or the anode feed port 30. Furthermore, although not shown, a blower may be required in order to provide adequate pressurization of the recycled anode exhaust flow 42. While FIGS. 1, 2A and 2B are section views, it will be seen in the later figures that the components and features of the integrated unit 10 are symmetrical about the axis 16, with the exception of the ports 34, 36 and 37.

With reference to FIG. 1 and FIG. 2A, the cathode flows will be explained in greater detail. As seen in FIG. 1, a cathode feed (typically air), shown schematically by arrows 44, enters the unit 10 via the port 34 and passes through an annular passage 46 before entering a radial passage 48. It should be noted that as used herein, the term "radial passage" is intended to refer to a passage wherein a flow is directed either radially inward or radially outward in a generally symmetric 360 degree pattern. The cathode feed 44 flows radially outward through the passage 48 to an annular passage 50 that surrounds the array 12 and passes through the cathode recuperator 20. The cathode feed 44 flows downward through the annular passage 50 and then flows radially inward to an annular feed manifold volume 52 that surrounds the annular array 12 to distribute the cathode feed 44 into each of the fuel cell stacks 14 where the cathode feed provides oxygen ions for the reaction in the fuel cell stacks 14 and exits the fuel cell stacks 14 as a cathode exhaust 56. The cathode exhaust 56 then flows across the reformer 24 into an annular exhaust manifold area 58 where it mixes with the combustion gas flow 40 which is directed into the manifold 58 via an annular passage 60. In this regard, it should be noted that the combustion gas flow 40 helps to make up for the loss of mass in the cathode exhaust flow 56 resulting from the transport of oxygen in the fuel cell stacks 14. This additional mass flow provided by the combustion gas flow 40 helps in minimizing the size of the cathode recuperator 20. The combined combustion gas flow 40 and cathode exhaust 56, shown schematically by arrows 62, exits the manifold 58 via a central opening 64 to a radial passage 66. The combined exhaust 62 flows radially outward through the passage 66 to an annular exhaust flow passage 68 that passes through the cathode recuperator 20 in heat exchange relation with the passage 50 to transfer heat from the combined exhaust 62 to the cathode feed 44. The combined exhaust 62 flows upward through the annular passage 68 to a radial passage 70 which directs the combined exhaust 62 radially inward to a final annular passage 72 before exiting the unit 10 via the exhaust port 36.

With reference to FIG. 1 and FIG. 2B, an anode feed, shown schematically by arrows 80, enters the unit 10 via the anode feed inlet port 30 preferably in the form of a mixture of recycled anode exhaust 42 and methane. The anode feed 80 is directed to an annular passage 82 that passes through the anode recuperator 22. The anode feed 80 then flows to a radial flow passage 84 where anode feed 80 flows radially outward to an annular manifold or plenum 86 that directs the anode feed into the reformer 24. After being reformed in the reformer 24, the anode feed 80 exits the bottom of reformer 24 as a reformats and is directed into an integrated pressure plate/anode feed manifold 90. The feed manifold 90 directs the anode feed 80 to a plurality of stack feed ports 92, with one of the ports 92 being associated with each of the fuel cell stacks 14. Each of the ports 92 directs the anode feed 80 into a corresponding anode feed/return assembly 94 that directs the anode feed 82 into the corresponding fuel cell stack 14 and collects an anode exhaust, shown schematically by arrows 96, from the corresponding stack 14 after the anode feed reacts in the stack 14. Each of the anode feed/return assemblies 94 directs the anode exhaust 96 back into a corresponding one of a plurality of stack ports 98 in the pressure plate/manifold 90 (again, one port 98 for each of the fuel cell stacks 14). The manifold 90 directs the anode exhaust 96 radially inward to eight anode exhaust ports 100 (again, one for each stack 14) that are formed in the pressure plate/manifold 90. The anode exhaust 96 flows through the ports 100 into a plurality of corresponding anode exhaust tubes 102 which direct the anode exhaust 96 to a radial anode exhaust flow passage 104.

The anode exhaust 96 flows radially inward through the passage 104 to an annular flow passage 106 that passes downward through the anode recuperator 22 in heat exchange relation with the flow passage 82. The anode exhaust 96 is then directed from the annular passage 106 upward into a tubular passage 108 by a baffle/cover 110 which is preferably dome-shaped. The anode exhaust 96 flows upwards through the passage 108 before being directed into another annular passage 112 by a baffle/cover 114, which again is preferably dome-shaped. The annular passage 112 passes through the anode cooler 26 in heat exchange relation with the annular cathode feed passage 46. After transferring heat to the cathode feed 44, the anode exhaust 96 exits the annular passage 112 and is directed by a baffle 116, which is preferably cone-shaped, into the anode exhaust port 32.

With reference to FIGS. 3A, 3B, the reformer 24 is provided in the form of an annular array 280 of eight tube sets 282, with each tube set 282 corresponding to one of the fuel cell stacks 14 and including a row of flattened tubes 284. In this regard, it should be noted that the number of tubes 284 in the tube sets 282 will be highly dependent upon the particular parameters of each application and can vary from unit 10 to unit 10 depending upon those particular parameters.

FIG. 3C is intended as a generic figure to illustrate certain construction details common to the cathode recuperator 20, the anode recuperator 22, and the anode cooler 26. The construction of each of these three heat exchangers basically consists of three concentric cylindrical walls A,B,C that define two separate flow passages D and E, with corrugated or serpentine fin structures G and H provided in the flow passages D and E, respectively, to provide surface area augmentation of the respective flow passages. Because the heat transfer occurs through the cylindrical wall B, it is preferred that the fins G and H be bonded to the wall B in order to provide good thermal conductivity, such as by brazing. On the other hand, for purposes of assembly and/or allowing differential thermal expansion, it is preferred that the fins G and H not be bonded to the cylindrical walls A and C. For each of the heat exchangers 20, 22 and 26, it should be understood that the longitudinal length and the specific geometry of the fins G and H in each of the flow paths D and E can be adjusted as required for each particular application in order to achieve the desired output temperatures and allowable pressure drops from the heat exchangers.

Turning now to FIG. 4A-D, the anode cooler 26 includes a corrugated or serpentine fin structure 300 to provide surface area augmentation for the anode exhaust 96 in the passage 112, a corrugated or serpentine fin structure 302 that provides surface area augmentation for the cathode feed flow 44 in the passage 46, and a cylindrical wall or tube 304 to which the fins 300 and 302 are bonded, preferably by brazing, and which serves to separate the flow passage 46 from the flow passage 112. As best seen in FIG. 4B, a cylindrical flow baffle 306 is provided on the interior side of the corrugated fin 300 and includes the dome-shaped baffle 114 on its end in order to define the inner part of flow passage 112. A donut-shaped flow baffle 308 is also provided to direct the cathode feed 44 radially outward after it exists the flow passage 46. The cone-shaped baffle 116 together with the port 32 are attached to the top of the tube 304, and include a bolt flange 310 that is structurally fixed, by a suitable bonding method such as brazing or welding, to the port 32, which also includes a bellows 311 to allow for thermal expansion between the housing 28 and the components connected through the flange 310. As seen in FIG. 4C, the above-described components can be assembled as yet another subassembly that is bonded together, such as by brazing.

In reference to FIGS. 1 and 4D, it can be seen that the anode recuperator 22 includes a corrugated or serpentine fin structure 312 (best seen in FIG. 8) in the annular flow passage 82 for surface area augmentation for anode feed 80. As best seen in FIG. 1, the anode recuperator 22 further includes another corrugated or serpentine fin structure 314 in the annular flow passage 106 for surface augmentation of the anode exhaust 96.

As best seen in FIG. 4D, corrugated fins 312 and 314 are preferably bonded to a cylindrical wall of tube 316 that serves to separate the flow passages 82 and 106 from each other, with the dome-shaped baffle 110 being connected to the bottom end of the wall 316. Another cylindrical wall or tube 320 is provided radially inboard from the corrugated fin 314 (not shown in FIG. 4D, but in a location equivalent to fin 300 in cylinder 304 as seen in FIG. 4B) to define the inner side of the annular passage 106, as best seen in FIG. 4D. As seen in FIG. 2A, an insulation sleeve 322 is provided within the cylindrical wall 320 and a cylindrical exhaust tube 324 is provided within the insulation sleeve 322 to define the passage 108 for the anode exhaust 96. Preferably, the exhaust tube 324 is joined to a conical-shaped flange 328 provided at a lower end of the cylindrical wall 320. With reference to FIG. 4D, another cylindrical wall or tube 330 surrounds the corrugated fin 312 to define the radial outer limit of the flow passage 82 and is connected to the inlet port 30 by a conical-shaped baffle 332. A manifold disk 334 is provided at the upper end of the wall 316 and includes a central opening 336 for receiving the cylindrical wall 320, and eight anode exhaust tube receiving holes 338 for sealingly receiving the ends of the anode exhaust tubes 102, with the plate 308 serving to close the upper extent of the manifold plate 334 in the assembled state.

With reference to FIGS. 2B and 4E, a heat shield assembly 350 is shown and includes an inner cylindrical shell 352 (shown in FIG. 2B), an outer cylindrical shell 354, an insulation sleeve 356 (shown in FIG. 2B) positioned between the inner and outer shells 352 and 354, and a disk-shaped cover 358 closing an open end of the outer shell 350. The cover 358 includes eight electrode clearance openings 360 for through passage of the electrode sleeves 211. As seen in FIG. 4E, the heat shield assembly 350 is assembled over an insulation disk 361 the outer perimeter of the assembled array 12 of fuel cells 14 and defines the outer extent of the cathode feed manifold 52. The heat shield 350 serves to retain the heat associated with the components that it surrounds. FIG. 5 shows the heat shield assembly 350 mounted over the stacks 14.

With reference to FIG. 1 and FIG. 6, the cathode recuperator 20 includes a corrugated or serpentine fin structure 362 to provide surface enhancement in the annular flow passage 68 for the combined exhaust 62, a corrugated or serpentine fin structure 364 to provide surface enhancement in the annular flow passage 50 for the cathode feed 44, and a cylindrical tube or wall 366 that separates the flow passages 50 and 68 and to which the fins 362 and 364 are bonded. A disk-shaped cover plate 368 is provided to close the upper opening of the cylindrical wall 366 and includes a central opening 370, and a plurality of electrode clearance openings 372 for the passage of the electrode sleeve 211 therethrough. A cylindrical tube or sleeve 376 is attached to the cover 368 to act as an outer sleeve for the anode cooler 26, and an upper annular bolt flange 378 is attached to the top of the sleeve 376. A lower ring-shaped bolt flange 380 and an insulation sleeve 382 are fitted to the exterior of the sleeve 376, and a cylindrical wall or shield 384 surrounds the insulation sleeve 382 and defines an inner wall for the passage 72, as best seen in FIGS. 1 and 6.

With reference to FIG. 7, the components of FIG. 6 are then assembled over the components shown in FIG. 5 with the flange 378 being bolted to the flange 310.

With reference to FIG. 4A, the outer housing 28 is assembled over the remainder of the unit 10 and bolted thereto at flange 380 and a flange 400 of the housing 28, and at flange 402 of the assembly 237 and a flange 404 of the housing 28, preferably with a suitable gasket between the flange connections to seal the connections.

FIG. 9 is a schematic representation of the previously described integrated unit 10 showing the various flows through the integrated unit 10 in relation to each of the major components of the integrated unit 10. FIG. 9 also shows an optional air cooled anode condenser 460 that is preferably used to cool the anode exhaust flow 39 and condense water therefrom prior to the flow 39 entering the combustor 38. If desired, the condenser may be omitted. FIG. 9 also shows a blower 462 for providing an air flow to the combustor 38, a blower 464 for providing the cathode feed 44, and a blower 466 for pressurizing the anode recycle flow 42. If desired, in an alternate embodiment of the unit 10 shown in FIG. 9 also differs from the previously described embodiment shown in FIG. 1 in that an optional steam generator (water/combined exhaust heat exchanger) 440 is added in order to utilize waste heat from the combined exhaust 62 to produce steam during startup. In this regard, a water flow 442 is provided to a water inlet port 444 of the heat exchanger 440, and a steam outlet port directs a steam flow 448 to be mixed with the anode feed 80 for delivery to the anode feed inlet port 30.

SUMMARY

One embodiment of the invention provides a fuel cell system, comprising a plurality of fuel cell stacks, and one or more devices which in operation of the system provide an azimuthal direction to one or more anode or cathode feed or exhaust fluid flows in the system.

Another embodiment of the invention provides a method of operating a fuel cell system which includes a plurality of fuel cell stacks, the method comprising providing an azimuthal direction to one or more anode or cathode feed or exhaust fluid flows in the system.

Another embodiment of the invention provides a fuel cell system, comprising a plurality of vertical fuel cell columns, each fuel cell column comprising at least one fuel cell stack, a voltage lead jumper which electrically connects one end of adjacent two of the plurality of vertical fuel cell columns, and electrical outputs for each adjacent two of the plurality of vertical fuel cell columns located on a second end thereof.

BRIEF DESCRIPTION OF THE DRAWINGS

FIG. 4E is an exploded perspective view showing the components of the fuel cell stacks, anode recuperator and anode cooler together with an insulation disk and heat shield housing of the integrated unit of FIG. 1;

FIG. 5 is a perspective view showing the assembled state of the components of FIG. 4E;

FIG. 6 is an exploded perspective view showing a cathode recuperator assembly together with other components of the integrated unit of FIG. 1;

FIG. 7 is an exploded perspective view showing the assembled components of FIG. 6 together with the assembled components of FIG. 4;

FIG. 8 is an exploded perspective view showing the assembled components of FIG. 7 together with an outer housing of the integrated unit of FIG. 1;

FIGS. 10A-10E are three dimensional views of an assembly according to the first embodiment of the invention.

FIG. 11A is three dimensional view of an unit according to the second embodiment of the invention. FIGS. 11B and 11C are side view and side cross sectional view, respectively, of a bottom portion of the unit of FIG. 11A.

FIGS. 12A and 12B are exploded perspective views of components of the third embodiment of the invention.

FIGS. 13B and 13C are side views of portion of the unit of FIG. 13A.

FIG. 14 is a three dimensional view of a jumper according to a fifth embodiment of the invention.

DETAILED DESCRIPTION

Figure 1:
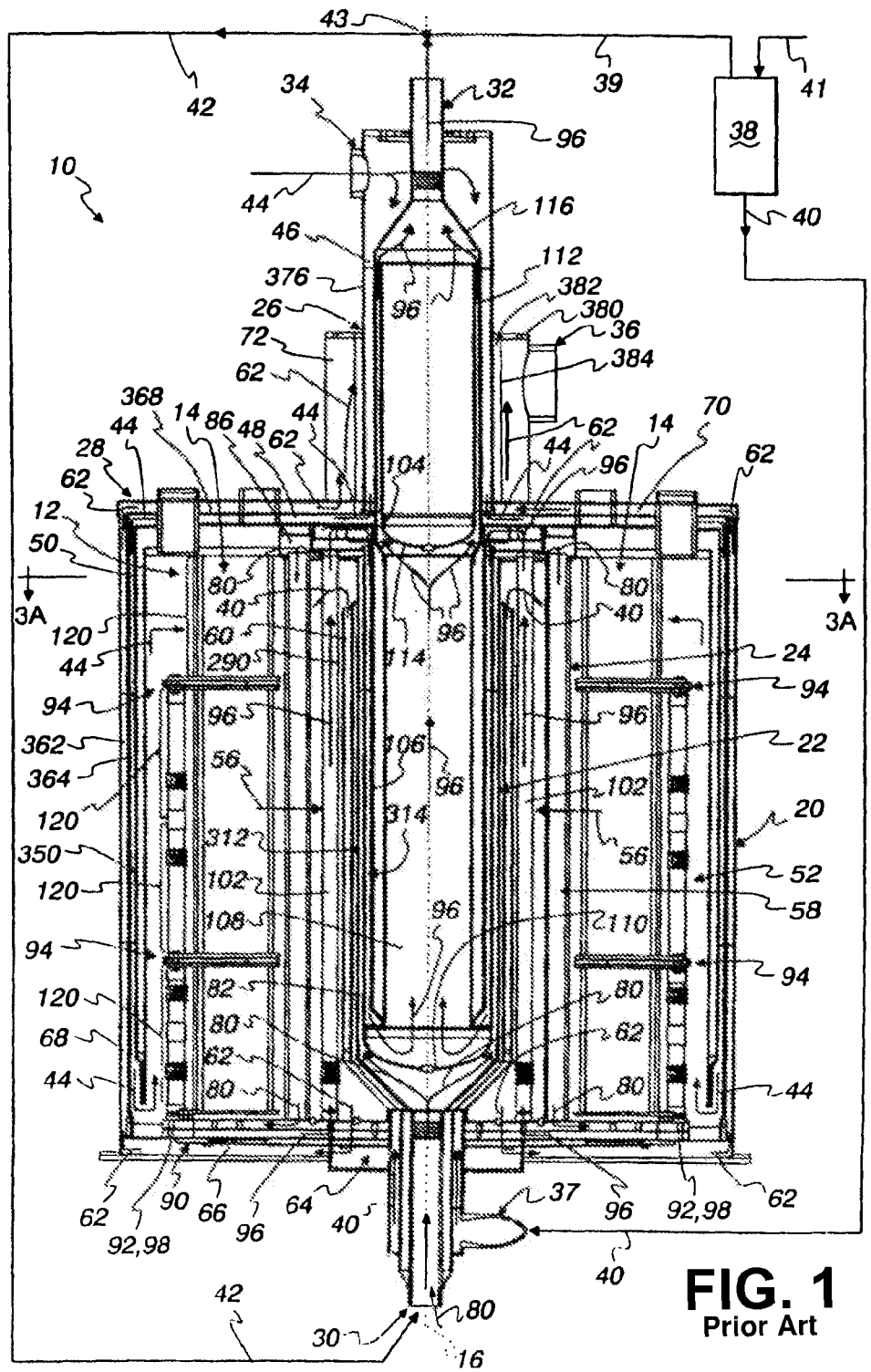
FIG. 1 is a sectional view of a prior art fuel cell unit with an integrated SOFC and fuel processor embodying the present invention.

In the embodiments of the invention, the present inventors realized that in the prior art unit 10 shown in FIGS. 1-9, the azimuthal flow mixing could be improved to avoid flow streams concentrating hot zones or cold zones on one side of the hot box 28 or another. Azimuthal flow as used herein includes flow in angular direction that curves away in a clockwise or counterclockwise direction from a straight line representing a radial direction from a center of a cylinder to an outer wall of the cylinder, and includes but is not limited to rotating, swirling or spiraling flow. The embodiments of the invention provide several methods and structures for introducing swirl to the fluid flows in the unit 10 to promote more uniform operating conditions, such as temperature and composition of the fluid flows, such as the cathode exhaust flow 56.

Thus, in the embodiments of the invention, an improved structure and method are provided to move or mix the cathode airstreams (e.g., the cathode or air exhaust streams) 56 coming out of the fuel cell stacks 14 shown in FIGS. 1-9. This would allow for mixing of heat between fuel cell columns or stacks. A hotter radial section of the hot box (the air flow tends to not mix in the radial direction) can transfer its heat to a cooler section of the hot box and vice versa for a cooler section of the hot box. In this way the radial temperature gradients can be decreased. In the embodiments of the invention, the anode tail gas oxidizer 38 may comprise a cylindrical tube or two concentric cylindrical tubes extending parallel to the central axis of the unit 10 and located between the anode recuperator 22 and the reformer tubes 24 (instead being located of outside of the housing or hot box 28).

In the first embodiment of the invention, a turning vane assembly 501 is provided to move heat azimuthally and/or radially across the hot box to reduce radial temperature gradients. FIG. 10A shows one exemplary structure of the turning vane assembly 501. In one embodiment, the assembly 501 may be located in place of the central opening 64 above the pressure plate 90 shown in FIG. 1. Alternatively, the assembly 501 may be located below pressure plate 90 (e.g., between plate 90 and the bottom plate 239 of housing 28) inside passage 66 shown in FIG. 1.

Figure 2A:
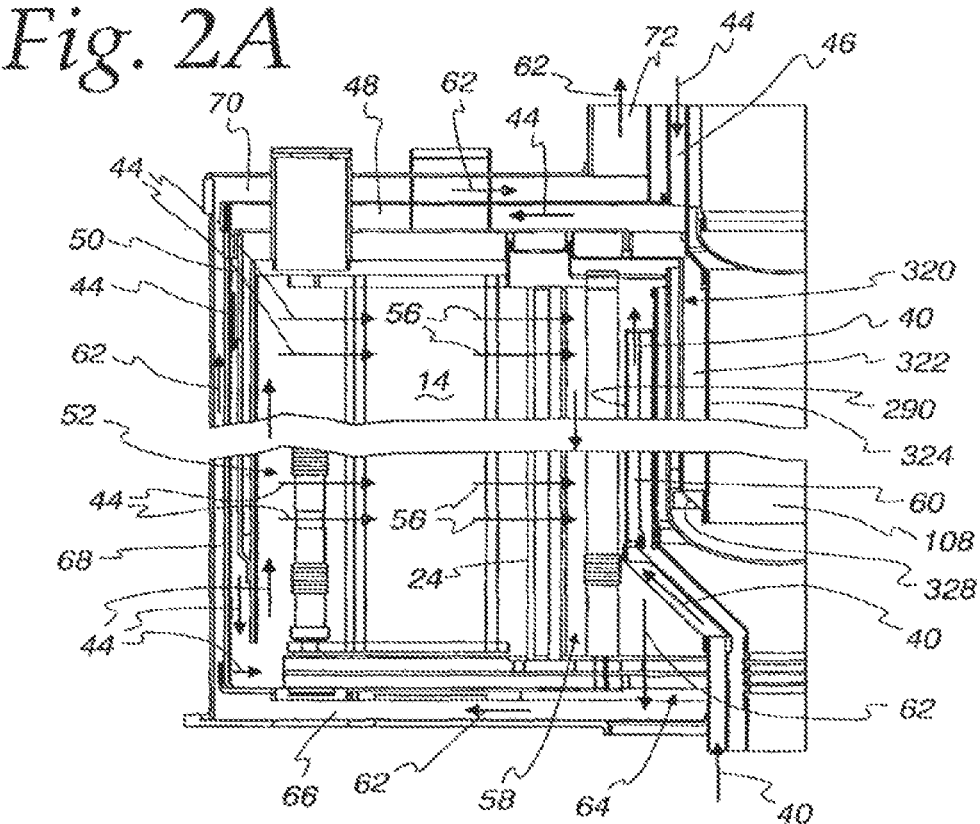
FIGS. 2A and 2B are sectional views showing one half of the fuel cell unit of FIG. 1, with FIG. 2A illustrating the flows of the cathode feed and exhaust gases and FIG. 2B illustrating the flows of the anode feed and exhaust gases.
Figure 2B:
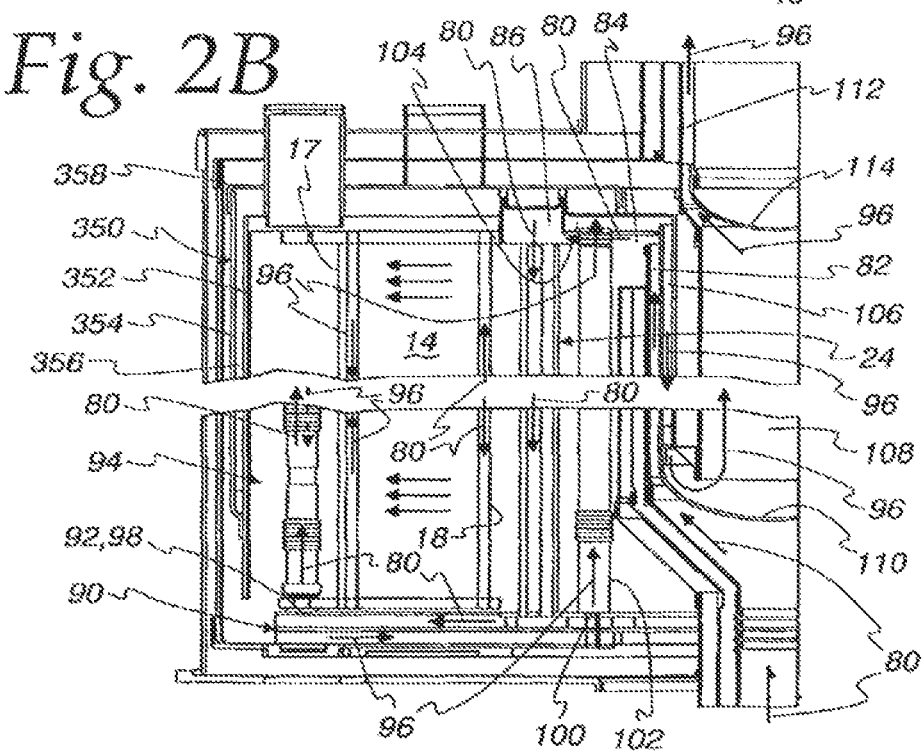
Figure 3A:
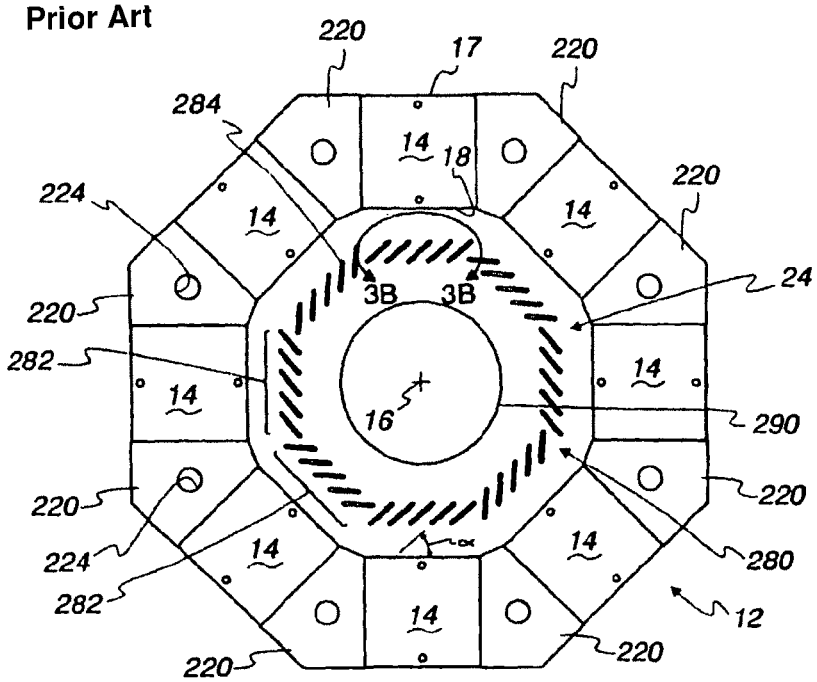
FIG. 3A is a sectional view taken from line 3A-3A in FIG. 1, but showing only selected components of the fuel cell unit.
Figure 3B:
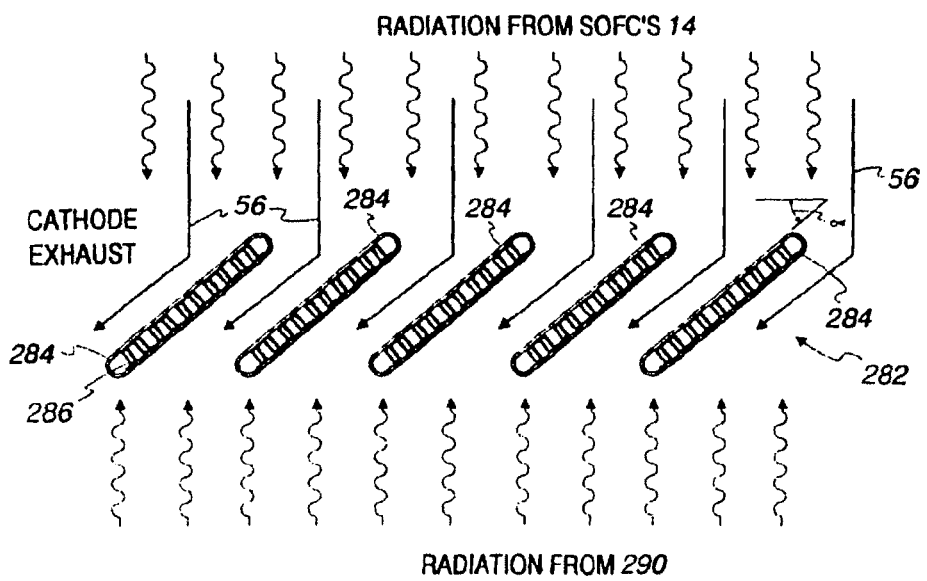
FIG. 3B is an enlarged, somewhat schematic view taken from line 3B-3B in FIG. 3A.
Figure 9:
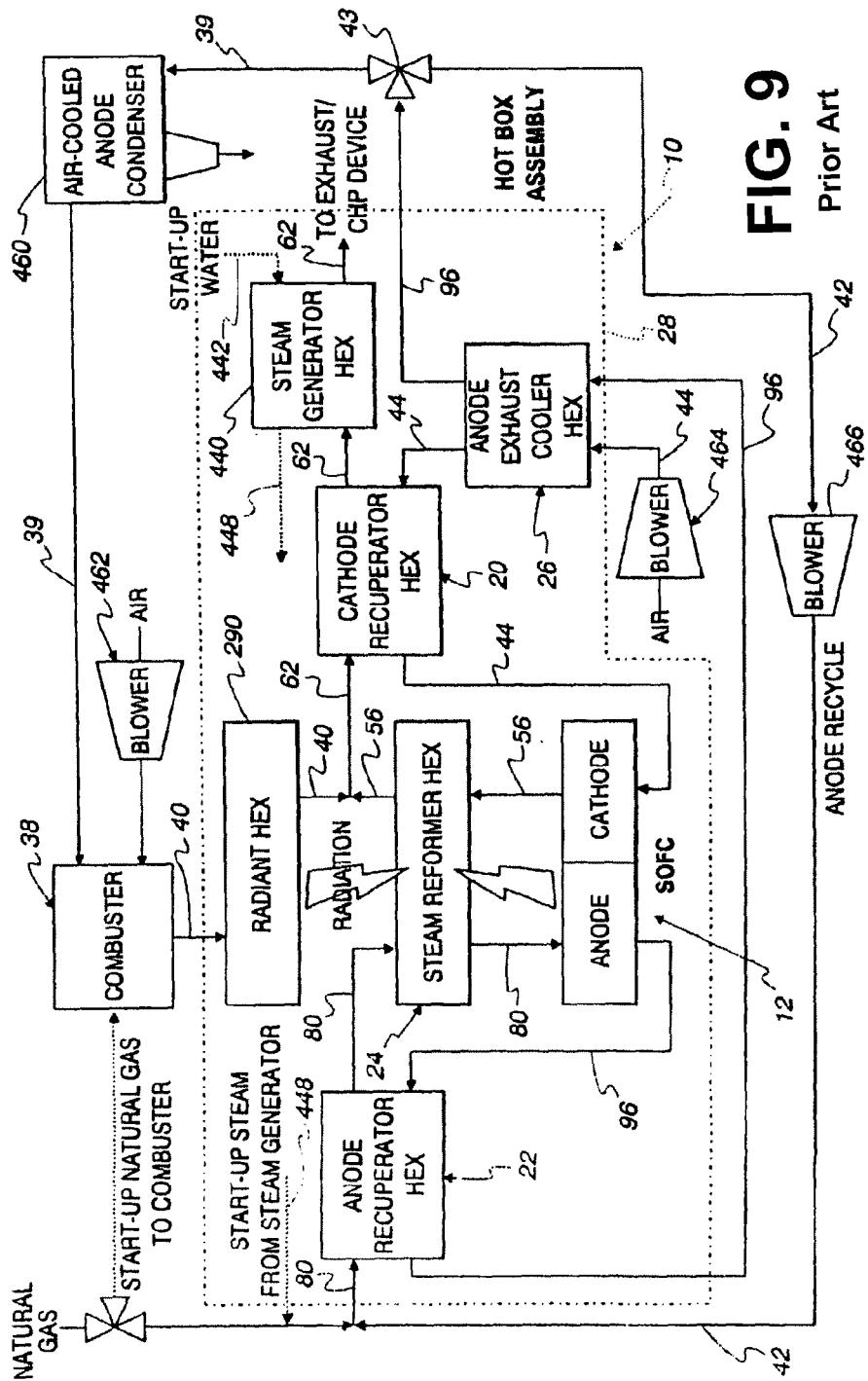
FIG. 9 is a schematic representation of the fuel cell unit if FIG. 1.

As discussed with respect to FIGS. 1, 2A and 9 above, the cathode exhaust 56 flows out of the stacks 14 and down through manifold 58 toward passage 66. If desired, the cathode exhaust 56 may be mixed with the output flow 40 of the ATO 38. However, instead of passing straight down through the central opening 64 into the radial passage 66, the cathode exhaust is provided to the turning vane assembly 501 which azimuthally redirects the cathode exhaust 56 and optional the ATO output 40 flows into the radial passage 66. The amount of redirection can be varied depending on the length and number of vanes.

Figure 10C:
Figure 10B:
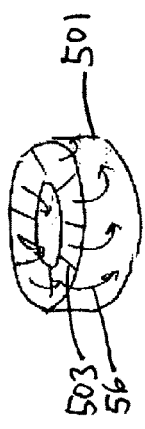

FIG. 10B shows an exemplary counterclockwise azimuthal flow direction of cathode exhaust 56 through assembly 501 where the flow has an angular component and a vertical component (e.g., up to down component). If desired, the turning vane assembly 501 may also exhaust the air in a radial ("r"-hat) direction into passage 66 (e.g., in a line or ray from the central axis toward the outer wall of housing 28) after being rotated in the azimuthal direction in assembly 501 in order to minimize pressure drop, as shown in FIG. 10C. In other words, the cathode exhaust 56 may be rotated in the azimuthal direction in the assembly 501 and then provided into the radial passage 66 either in the azimuthal direction (as shown in FIG. 10B) or in the radial direction (as shown in FIG. 10C).

As shown in FIG. 10A, the assembly 50 may comprise two or more vanes 503 (which may also be referred to as deflectors or baffles) located inside an enclosure 505. The enclosure contains side and bottom surfaces (where the bottom surface may comprise the top surface of the plate 90), but is generally open on top to receive the cathode exhaust 56 flow. The vanes 503 may be curved as shown in FIG. 10A or they may be straight. Preferably, the vanes 503 are curved such that the shape of turning vane 503 curve is in a golden ratio arc or in catenary curve shape in order to minimize pressure drop per rotation effect.

The vanes 503 are slanted (i.e., positioned diagonally) with respect to the vertical direction at an angle of 10 to 80 degrees, such as 30 to 60 degrees, to direct the cathode exhaust 56 in the azimuthal direction. At the base of each vane 503, an opening 564 through the plate 90 is provided instead of the common central opening 64. The plurality of openings 564 provide the cathode exhaust azimuthally from the assembly 501 into the radial passage 66 located below plate 90. While the assembly 501 is referred to as turning vane assembly, it should be noted that the assembly 501 does not rotate or turn about its axis. The term "turning" refers to the turning of the cathode exhaust stream 56 in the azimuthal direction.

Figure 10E:
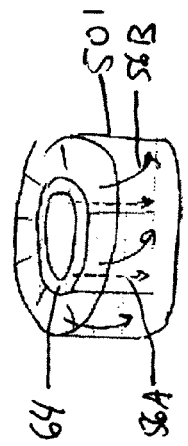
Figure 10D:
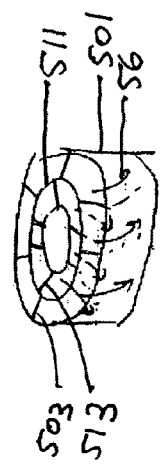

In an alternative configuration of the system of the first embodiment shown in FIG. 10D, more than one turning vane assembly 501, 511 is provided. For example, the vanes 503 in assembly 501 move the cathode exhaust stream in opposite azimuthal direction from that of the vanes 513 in assembly 511. In other words, the vanes 503 may be slanted to the left to direct the cathode exhaust counter-clockwise while vanes 513 may be slanted to the right to direct the cathode exhaust clockwise. This creates a better heat/temperature averaging throughout the hot box 28. The assembly 501 may be located inwardly or outwardly to assembly 511 with respect to the central axis of the unit 10. There may be more than two turning vane assemblies if desired, separated from each other in the radial direction.

In another alternative configuration, the assemblies 501, 511 may have different vane 503, 513 lengths to create different angular directions of cathode exhaust 56 flow for better heat/temperature averaging throughout the hot box 28. The assemblies 501, 511 may direct the cathode exhaust 56 in the same direction or in opposite directions (i.e., one clockwise the other counterclockwise, or both in the same clockwise or counterclockwise direction) but at different radial angles.

In another configuration shown in FIG. 10E, one of the assemblies 501, 503 (such as the inner assembly 503 for example) is replaced with the central opening 64 (e.g., a bypass opening) shown in FIG. 1. Thus, one portion of the cathode exhaust 56A moves straight down into passage 66 while the remaining portion of the cathode exhaust 56B is provided azimuthally into passage 66 by the turning vane assembly.

If desired, an additional mixer similar in structure to the turning vane assembly may be located in manifold 58. The additional mixer is used to mix the cathode exhaust streams 56 exiting the stacks 14 together into one exhaust stream and then distributes back out at the bottom of the reformer 24. This may create even better heat/temperature averaging throughout the hot box 28. The additional mixer may be used together with the assembly 501 or instead of the assembly 501.

In a second embodiment of the invention, spiral deflectors 601 (which may also be referred to as vanes or baffles) are provided in the base of the unit (e.g., in the radial passage 66 between plates 90 and 139) to direct cathode exhaust flow to the side (e.g., in the radial and/or azimuthal direction). The direction should be consistent with reformer 24 tubes and pitched fins 503 (if any) of the assembly 501. In other words, the deflectors 601 may be used together with the assembly 501 of the first embodiment or without the assembly 501 of the first embodiment.

As shown in FIGS. 11A and 11B, the deflectors 601 comprise plates, such as heat resistant metal or ceramic plates, which are positioned in the passage 66 to deflect the cathode exhaust 56 in the azimuthal and/or radial direction. The deflectors 601 may be arranged in a spiral configuration to rotate the cathode exhaust 56 in the clockwise or counter-clockwise direction. FIG. 11C illustrates the use of the turning vane assembly 501 together with the deflectors 601. The deflectors are arranged below the openings 564 in the assembly 501 to receive the cathode exhaust 56 from the openings 564 and to provide an additional twist or swirl in the azimuthal and/or radial direction to the cathode exhaust 56. Alternatively, two or more rows of spiral deflectors may be provided in the base (e.g., in passage 66), with the bottom row directing the cathode exhaust 56 flow clockwise, and the top row directing flow counterclockwise or vise versa. The deflectors 601 may have any suitable height in the base. Thus, the deflectors 601 may extend to the full height of the passage

66. Alternatively, the deflectors 601 may extend to the partial height of the passage 66 and be fixed either to the top or bottom surface of the passage 66.

In a third embodiment of the invention, as shown in FIGS. 12A and 12B, respective vanes or deflectors 701A, 701B are provided on the top of the heat shield 350 and/or on cover plate 368 of the cathode recuperator 20 to direct the respective cathode feed (air inlet flow) 44 and/or the cathode exhaust 56 in the azimuthal and/or radial directions in the upper portions of the unit 10. The vanes or deflectors 701A, 701B may extend in the same or different directions from each other and may extend either in azimuthal or radial directions. For example, vanes 701A may point in a clockwise azimuthal direction while vanes 701B may point in the counterclockwise azimuthal direction (or vice versa). The vanes or deflectors 701A, 701B may comprise reinforcing ribs which protrude from the respective heat shield 350 or cover plate 368. While straight vanes or deflectors are shown, it should be understood that the vanes or deflectors may be curved (e.g., spiral shaped). The vanes or deflectors may be used in the reformer header to direct flow to the side.

Figure 3C:
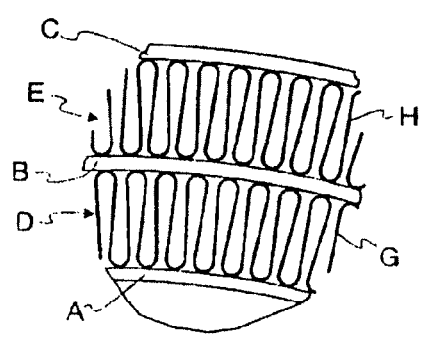
FIG. 3C is a partial section view illustrating construction details common to several heat exchangers contained within the integrated unit of FIG. 1.
Figure 4C:
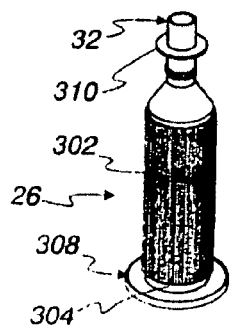
FIG. 4C is a perspective view showing the components of FIGS. 4A and B in their assembled state.
Figure 4D:
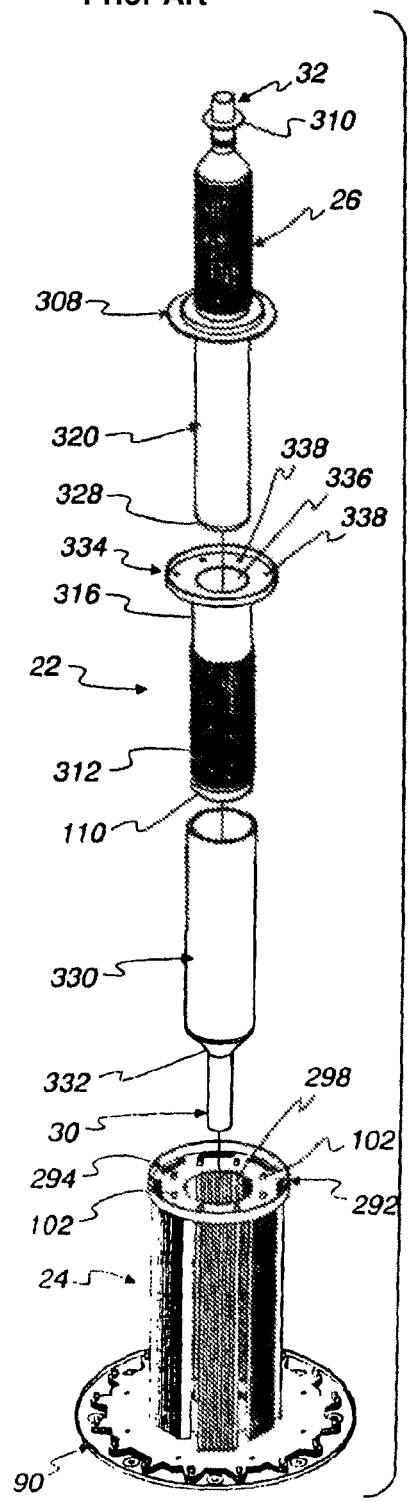
FIG. 4D is an exploded perspective view showing the assembled components together with an anode recuperator of the integrated unit of FIG. 1.

In a fourth embodiment of the invention, the fins or ribs in one or more of the heat exchangers are pitched (e.g., extend in a diagonal or helical direction) rather than comprising corrugated or serpentine fins which extend in the vertical direction as shown in FIGS. 1 and 3C. The fins or ribs of the fourth embodiment may comprise individual fins or they may comprise a corrugated or serpentine sheet which is arranged to provide a pitched fin configuration.

Figure 13A:
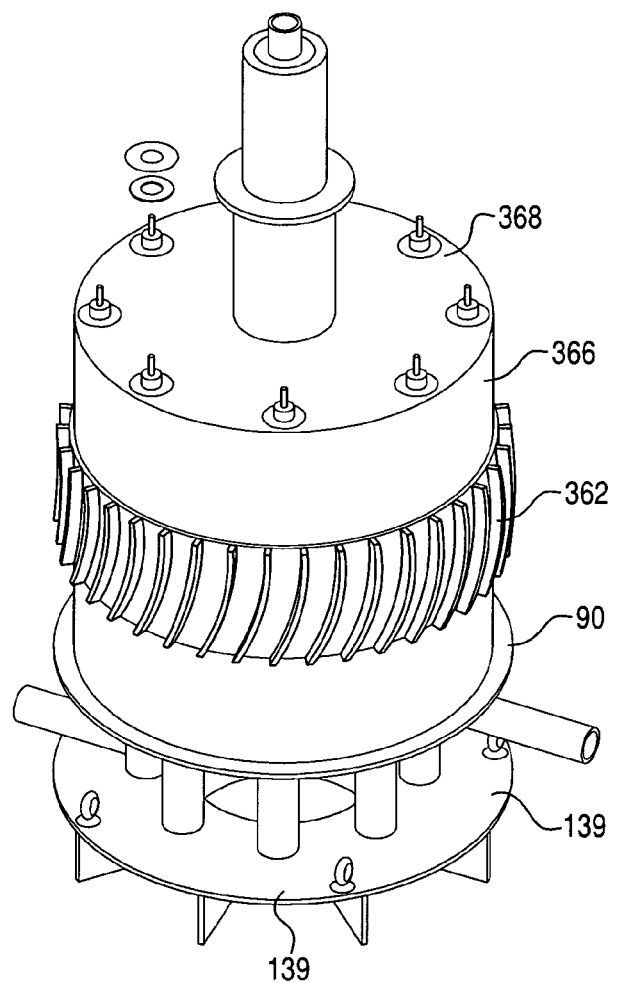
FIG. 13A is three dimensional view of an unit according to the fourth embodiment of the invention.

For example, as shown in FIG. 13A, the outer fins 362 on the outer surface of the tube 366 are pitched. In other words, the fins 362 are spiraling and are arranged diagonally with respect to the vertical orientation. The pitched fins may be used on one or both surfaces of the cathode recuperator 20 tube 366. If both surfaces use pitched fins, the inside fin 364 pitch should be opposite to the outside fin 362 pitch (e.g., if fins 362 are tilted to the right, then fins 364 should be tilted to the left). The pitch for the cathode exhaust should be in the same direction as the pitch of the reformer 24 tubes 282 shown in FIG. 3A. Alternatively, the pitched fins may be located on one or both surfaces of the anode recuperator 22 and/or of the anode cooler 26. If both surfaces use pitched fins, the inside pitch should be opposite to the outside pitch. Thus, fins 300, 302, 312 and/or 312 may also be pitched.

Likewise, the fins inside and/or outside the ATO 38 may pitched. If both surfaces use pitched fins, the inside pitch should be opposite to the outside pitch. The fin backbone may could run at an angle, such as at an angle of 30-60 degrees from the vertical direction. For manufacturing purposes, the fins may need to be installed in multiple segments of pitched fins. FIG. 13B shows four segments 802A, 802B, 802C and 802D of pitched fins 801. The figure shows the pitch with the same rotation for each horizontal segment. It is also possible to reverse the fin rotation for alternate segments, such that the fins 801 in odd numbered segments 802A, C which circle the ATO 38 are slanted or tilted to the left and those in even numbered segments 802B, D are slanted or tilted to the right.

In an alternative configuration, vertical fins with pitched transitions between segments may be used as shown in FIG. 13C. As shown in FIG. 13C, vertical fin 803 segments 804 are separated by pitched (i.e., slanted) fin 801 segments 802. The fin to fin distance between adjacent fins 801 and between adjacent fins 803 may be the same. Alternatively, fin to fin distance between adjacent fins 801 is at least 10% greater, such as at least 50% greater, for example between 2 and 10 times greater than the distance between adjacent fins 803 to induce flow with some horizontal component. Alternatively, instead of using segments, the slanted fins 801 may be formed by welding a channel on one surface of the inner or outer or both shells of the ATO 38 annulus. In conjunction with any of the above, rotation or swirl may be introduced by appropriately slanted baffles or deflectors in the inlet cone to the ATO 38 annulus.

The pitched fins may be provided to the unit 10 using any one of several different configurations or methods. In one configuration, pitched (e.g., slanted) fins are individually attached to the surface of the desired heat exchanger 20, 22, 26 and/or 38. Such fins may extend the entire height of the region of the heat exchanger in which fins are located, as shown in FIG. 13A.

In another configuration, the pitched fins are provided in narrow segments as shown in FIGS. 13B and 13C. The fins and/or fin segments may be attached to the heat exchanger cylinders or shells using any suitable methods, such as brazing. Alternatively, rather than attaching fins or segment strips to cylindrical heat exchanger walls, grooves may be formed in the heat exchanger walls by machining or other methods to leave a plurality of pitched grooves separated by pitched fins.

Figure 13D:
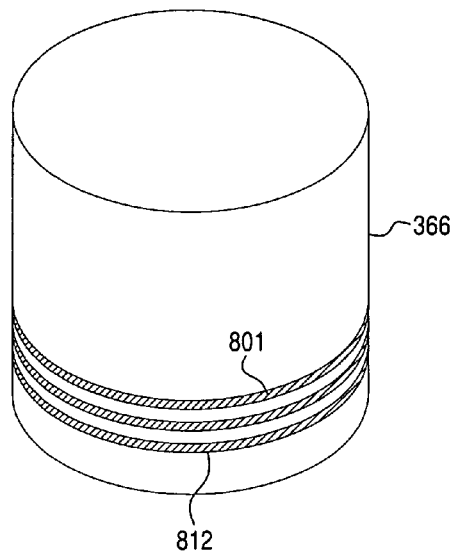
FIGS. 13D and 13E are three dimensional views of heat exchangers according to the fourth embodiment of the invention.

Alternatively, the segments or strips may be attached without using brazing. As shown in FIG. 13D, the strips 812 have heat exchanger fins 801 which are at a bias to the vertical direction (i.e., are inclined with respect to the strip height and length by 10-80 degrees, such as by 30 to 60 degrees) to result in rotating flow. Because the strips are not brazed, they can be flexed into a circle around the desired cylindrical heat exchanger shell and/or be inserted between the heat exchanger cylindrical shells If desired, the unit may have a hot zone with this type of construction (where radiation heat transfer is more dominant) and a colder zone where brazing is used and strips have fins which are not biased or slanted. Alternatively, diffusion bonding, such as oxide growth, may be used to create the rigid conduction path for heat with the fins. Preferably, the strips 812 are relatively thin (e.g., have a relatively small height and thickness) to allow easy bending. The heat exchanger is formed by several rows of strips 812 arranged around the heat exchanger's inner or outer cylindrical surface in the vertical direction, as shown in FIG. 13D.

Figure 13E:
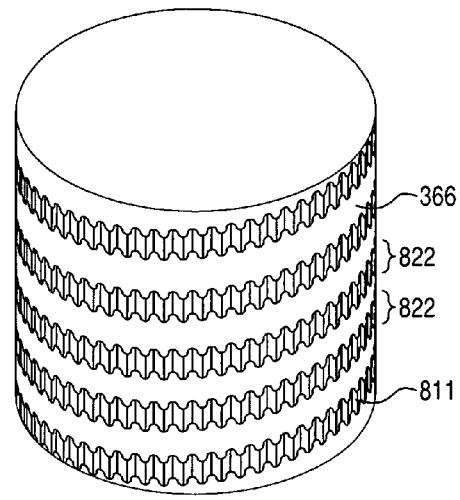

In another configuration shown in FIG. 13E, the fins 811 are not biased or slanted on each strip 822. Instead, the fins 811 are arranged so that they extend in the strip's height direction (e.g., perpendicular to the strip length direction). For example, in this configuration, the strip 822 shown in FIG. 13H is a straight corrugated sheet metal strip, for ease of manufacturing. The strip 822 is wrapped in a helical fashion as shown in FIG. 13E around the heat exchanger's inner or outer cylindrical surface. Sufficiently thin material is desired to achieve the required pliability.

Figure 13F:
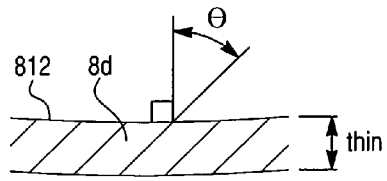
FIGS. 13F and 13G are side views of a portion of the heat exchanger of FIG. 13D
Figure 13G:
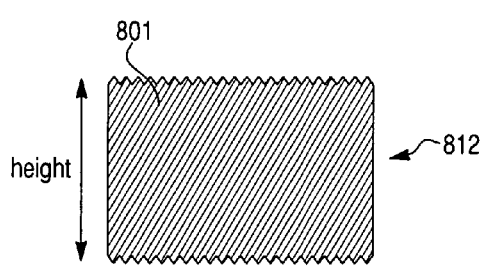
Figure 13H:
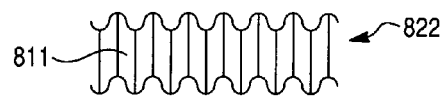
FIG. 13H is a side view of a portion of the heat exchanger of FIG. 13E.

Thus, as shown in more detail in FIGS. 13F and 13G, the strips 812 of FIG. 13D are arranged horizontally inside or outside each cylinder, but the fins 801 are slanted in a diagonal direction to provide swirl or spiral fluid flow. In contrast, as shown in more detail in FIG. 13H, the strips 822 of FIG. 13E are arranged in a helical or diagonal direction inside or outside each cylinder, but on each strip 822, the fins 811 are arranged in the strip height direction. Since the strips 822 are arranged in a helical direction, the fins 811 are arranged in the same direction as fins 801 on the heat exchanger to provide the same effect for the fluid spiral or swirl flow.

Figure 4A:
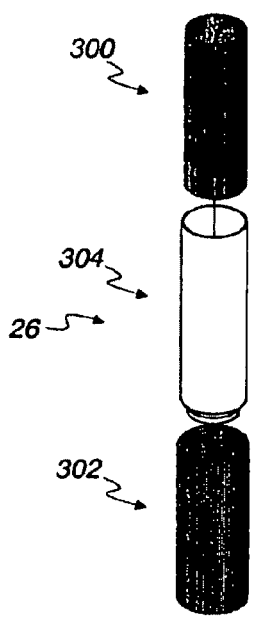
FIGS. 4A and 4B are exploded perspective views of the components of an anode exhaust cooler of the integrated unit of FIG. 1.
Figure 4B:
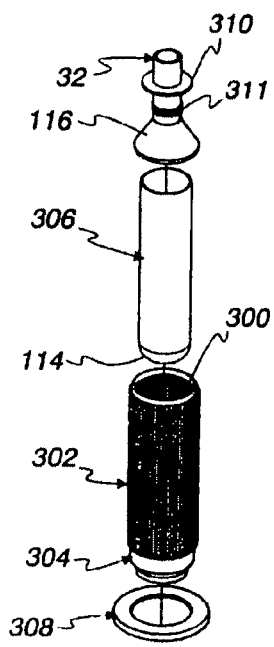

In the prior art configuration, as shown in FIGS. 4E, 5, 6, 7 and 8, the electrodes 210 in electrode sleeves 211 protrude through clearance openings 372 in the top of the unit 10. In another embodiment of the invention, the electrode connection through the top of the unit 10 using sleeves and openings 372 may be omitted. Instead, as shown in FIG. 14, a voltage lead jumper 900 electrically connects the tops of two adjacent vertical columns of stacks 14 (the stacks 14 are shown in FIG. 4E). Thus, two adjacent stack columns are electrically connected in series and are referred to as a stack column pair. Therefore, if there are eight columns of stacks 14 in the unit 10, then there are four jumpers 900, each located in one of four pairs of stack columns. The electrical outputs for each stack column pair may be located on the bottom of the unit 10. Thus, one electrical output may be connected to the first stack column and the other electrical output may be connected to the second stack column of each stack column pair. The electrical outputs may comprise current collection rods or other current take off devices which extend through the bottom surface of the unit 10 to a power conditioning module or device.

The jumper 900 may comprise a flexible, high temperature resistant, electrically insulating sleeve 903. For example, the sleeve 903 may comprise a plurality of hollow ceramic cylinders, such as 10 to 30, for example 20 alumina cylinders which can move with respect to adjacent cylinders to provide flexibility to the sleeve 903. A high temperature metal or metal alloy strand rope wire 901, such as an Inconel or other nickel alloy wire, is located in the sleeve 903. Additional electrical insulation may be provided over the wire 901 inside the sleeve. The wire 901 is electrically connected on both ends to electrically conductive terminals, such as steel or Inconel terminals 905 which can be bolted to the stacks through bolt holes 907. The terminals 905 may be connected to the wire 901 using Inconel or other connectors.

Each component or method of the first, second, third, fourth or fifth embodiment may be used alone or in combination with any one or more other components or methods of the remaining embodiments. While the first through fourth embodiments for introducing rotation or swirl to the fluid flows are illustrated with respect to the unit 10 shown in FIG. 1, it should be understood that the components and methods of any one or more of the first through fourth embodiments may be used in a unit having a different overall structure or method of operation than unit 10. Likewise, the jumper 900 may be used in other fuel cell systems with or without devices for introducing rotation or swirl to the fluid flows.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

The invention claimed is:

1. A fuel cell system, comprising:
   a plurality of vertical fuel cell columns, each fuel cell column comprising at least one fuel cell stack, wherein the at least one fuel cell stack comprises a plurality of horizontal fuel cells stacked vertically;
   a voltage lead jumper which electrically connects top ends of adjacent two of the plurality of vertical fuel cell columns such that the adjacent two vertical fuel cell columns form a column pair in which the columns are electrically connected in series; and
   an electrical output located on a bottom end of each of the adjacent two vertical fuel cell columns, wherein the electrical outputs comprise current collection rods which extend through a bottom surface of the system and are electrically connected to a power conditioning module or device;
   wherein each of the plurality of vertical fuel cell columns comprises a plurality of fuel cell stacks, wherein a first fuel cell stack in a first fuel cell column is separated from an adjacent second fuel cell stack in the first fuel cell column by an anode feed/return assembly;
   wherein the plurality of vertical fuel cell columns comprise solid oxide fuel cell columns and the solid oxide fuel cell columns and the voltage lead jumper are enclosed in a housing; and
   wherein the voltage lead jumper comprises a flexible, thermally and electrically insulating sleeve enclosing a metal or metal alloy wire and the flexible, thermally and electrically insulating sleeve comprises a plurality of hollow ceramic cylinders which enclose the metal or metal alloy wire and each of the plurality of hollow ceramic cylinders can move with respect to an adjacent one of the plurality of hollow ceramic cylinders to provide flexibility to the sleeve.

2. The system of claim 1, wherein the voltage lead jumper is located in an integrated solid oxide fuel cell and fuel processor unit.

3. The system of claim 1, wherein the housing comprises a hot box, and the voltage lead jumper is located in the hot box.

4. The system of claim 3, wherein:
   the voltage lead jumper electrically connects top ends of adjacent two of the plurality of vertical fuel cell columns in the hot box; and
   the electrical outputs extend through a bottom surface of the hot box and are electrically connected to a power conditioning module or device.

5. The system of claim 4, wherein:
   a top electrical output of a first vertical fuel cell column in the column pair is electrically connected to a top electrical output of a second vertical fuel cell column in the column pair using the voltage lead jumper;
   a bottom electrical output of the first vertical fuel cell column in the column pair is electrically connected to the power conditioning module or device; and
   a bottom electrical output of the second vertical fuel cell column in the column pair is electrically connected to the power conditioning module or device.

6. The system of claim 5, further comprising a plurality of column pairs in the hot box.

7. The system of claim 6, wherein each of the plurality of column pairs comprises the voltage lead jumper which connects a top electrical output of a first vertical fuel cell column in the column pair to a top electrical output of a second vertical fuel cell column in the column pair.

8. The system of claim 1, wherein the housing comprises a bottom surface; and wherein the electrical outputs comprise current collection rods which extend through the bottom surface.

9. A fuel cell system, comprising:
   a plurality of fuel cell columns, each fuel cell column comprising at least one fuel cell stack, wherein the at least one fuel cell stack comprises a plurality of horizontal solid oxide fuel cells stacked vertically;
   a voltage lead jumper which electrically connects top ends of adjacent two of the plurality of fuel cell columns such that the adjacent two fuel cell columns form a column pair in which the columns are electrically connected in series; and
   an electrical output located on a bottom end of each of the adjacent two fuel cell columns;
   wherein the voltage lead jumper comprises a flexible, thermally and electrically insulating sleeve enclosing a metal or metal alloy wire; and wherein the flexible, thermally and electrically insulating sleeve comprises a plurality of hollow ceramic cylinders which enclose the metal or metal alloy wire and each of the plurality of hollow ceramic cylinders can move with respect to an adjacent one of the plurality of hollow ceramic cylinders to provide flexibility to the sleeve.

10. The system of claim 9, wherein the electrical outputs comprise current collection rods which extend through a bottom surface of the system and are electrically connected to a power conditioning module or device.

11. The system of claim 9, wherein the voltage lead jumper is located in a hot box of a solid oxide fuel cell unit and the plurality of fuel cell columns comprise a plurality of vertical fuel cell columns.

* * * * *